United States Patent
Zhang et al.

(10) Patent No.: US 12,402,191 B2
(45) Date of Patent: *Aug. 26, 2025

(54) CONTROL METHOD OF USER EQUIPMENT AND USER EQUIPMENT

(71) Applicant: SHARP KABUSHIKI KAISHA, Sakai (JP)

(72) Inventors: Chongming Zhang, Shanghai (CN); Renmao Liu, Shanghai (CN); Shohei Yamada, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 127 days.

This patent is subject to a terminal disclaimer.

(21) Appl. No.: 18/200,800

(22) Filed: May 23, 2023

(65) Prior Publication Data

US 2023/0292390 A1 Sep. 14, 2023

Related U.S. Application Data

(63) Continuation of application No. 17/258,970, filed as application No. PCT/CN2019/095232 on Jul. 9, 2019, now Pat. No. 11,700,663.

(30) Foreign Application Priority Data

Jul. 10, 2018 (CN) .......................... 201810754064.9

(51) Int. Cl.
*H04W 76/19* (2018.01)
*H04W 76/15* (2018.01)
*H04W 76/18* (2018.01)
*H04W 76/27* (2018.01)
*H04W 80/02* (2009.01)
*H04W 84/18* (2009.01)

(52) U.S. Cl.
CPC .......... *H04W 76/19* (2018.02); *H04W 76/15* (2018.02); *H04W 76/18* (2018.02); *H04W 76/27* (2018.02); *H04W 80/02* (2013.01); *H04W 84/18* (2013.01)

(58) Field of Classification Search
CPC ..... H04W 76/19; H04W 76/15; H04W 76/18; H04W 76/27; H04W 80/02; H04W 84/18; H04W 4/50
See application file for complete search history.

(56) References Cited

U.S. PATENT DOCUMENTS

| | | | |
|---|---|---|---|
| 2018/0035483 A1* | 2/2018 | Nagasaka | H04W 28/085 |
| 2018/0160339 A1* | 6/2018 | Wu | H04L 5/0035 |
| 2018/0184482 A1* | 6/2018 | Susitaival | H04W 76/18 |
| 2019/0182689 A1* | 6/2019 | Martin | H04W 76/19 |
| 2019/0289510 A1* | 9/2019 | Rugeland | H04W 36/0079 |
| 2019/0356536 A1* | 11/2019 | Lee | H04L 41/0654 |
| 2020/0045764 A1* | 2/2020 | Kim | H04W 36/00695 |
| 2020/0107390 A1* | 4/2020 | Hwang | H04W 8/02 |

(Continued)

*Primary Examiner* — Will W Lin
(74) *Attorney, Agent, or Firm* — ScienBiziP, P.C.

(57) ABSTRACT

A method performed by a user equipment (UE) is provided. The method detects a failure in a master cell group (MCG) transmission. The method, after determining that the UE is configured with a resume timer, transmits a message to a base station (BS). The message includes information related to the failure. The method also starts the resume timer upon sending the message to the BS, and triggers a radio resource control (RRC) connection re-establishment procedure when the resume timer expires.

20 Claims, 4 Drawing Sheets

(56) References Cited

U.S. PATENT DOCUMENTS

| | | | |
|---|---|---|---|
| 2020/0169887 A1* | 5/2020 | Wager | H04W 12/106 |
| 2020/0205003 A1* | 6/2020 | Ingale | H04W 12/04 |
| 2021/0068186 A1* | 3/2021 | Wu | H04W 28/04 |
| 2021/0153281 A1* | 5/2021 | Deogun | H04W 76/16 |

* cited by examiner

UE 40

CONTROL METHOD OF USER EQUIPMENT AND USER EQUIPMENT

CROSS-REFERENCE TO RELATED APPLICATION(S)

The present disclosure is a continuation application of U.S. patent application Ser. No. 17/258,970, filed on Jan. 8, 2021, which is national stage application of International Patent Application Serial No. PCT/CN2019/095232, filed on Jul. 9, 2019, which claims the benefit of and priority to Chinese Patent Application Serial No. 201810754064.9, filed on Jul. 10, 2018, the contents of all which are hereby incorporated herein fully by reference for all purposes.

FIELD

The present disclosure is generally related to wireless communications, and more particularly, the present disclosure relates to and control method of user equipment and user equipment.

BACKGROUND

As mobile communication grows and its technology improves, the world is moving toward a community that is a completely interconnected network and in which anyone or anything can obtain information and share data at anytime and anywhere. To meet the requirements of enhanced Mobile Broadband (eMBB) and massive Machine-Type Communication (mMTC), the next-generation wireless communication technology (5G) is researching the possible enhancements in technology for users in dual connectivity or multi connectivity (RP-181469 New WID on DC and CA enhancements).

Dual connectivity or multi connectivity refers to a user equipment (UE) operating in connected status and building physical channels with more than one network node, and performing data transmission. Network nodes may include a Master Node (MN) and a Secondary Node (SN). The MN is executed by a Next Generation NodeB (gNB) an evolved NodeB (eNB) or a next generation-eNB (ng-eNB), and the serving cell group controlled by the MN is called the Master Cell Group (MCG). Correspondingly, the SN is executed by one or more gNB/eNB/ng-eNB, and the serving cell group controlled by the SN is called the Secondary Cell Group (SCG).

The UE that is configured with dual connectivity or multi connectivity may perform communication via MCG or SCG. In the present disclosure, when there is a link transmission problem that occurs in the MCG, even though the UE is able to transmit normally via the SCG, the UE is still required to trigger a radio resource control (RRC) connection re-establishment procedure. Upon cell reselection, the UE selects a suitable cell to perform a link connection resume and simultaneously releases an SCG that has been configured previously. The re-establishment procedure requires a period of time to run, and may fail. The re-establishment procedure may cause disconnection in the UE transmission, which increases transmission delay.

To address these issues, the present disclosure provides, when a failure occurs in an MCG link, if an SCG is able to operate normally, the UE may report message(s) to the network side via the SCG to indicate that the failure has occurred in the MCG. Subsequently, the network side sends an RRC reconfiguration message to the UE via the SCG. The UE may continue to operate via the reconfiguration, and, thereby, minimize the effects of the link disconnection.

The problem to be solved involves how the UE processes the present bearer(s) when a problem has occurred in the MCG transmission. Correspondingly, how to resume a logical link transmission after the UE receives an RRC reconfiguration message also needs to be addressed. Additionally, when the MCG transmission problem has occurred and before the UE receives the reconfiguration message, if a problem also occurs in the SCG link, how the UE should operate also needs to be addressed.

SUMMARY

The present disclosure proposes solutions to the following problems: how the UE processes the present bearer(s) when a problem occurs in the MCG transmission; how to resume a logical link transmission after the UE receives an RRC reconfiguration message; and when the MCG transmission problem has occurred and before the UE receives reconfiguration message, if a problem also occurs in the SCG link, how the UE operates. More specifically, the present disclosure provides a control method for a user equipment.

According to a first aspect of the present disclosure, a method for a UE is provided. the method includes: performing communication with a master cell group (MCG) and a secondary cell group (SCG); detecting whether a failure has occurred in an MCG transmission; if it is detected that the failure has occurred in the MCG transmission, executing an MCG failure processing operation; and sending a message to a base station, the message indicating information related to the failure.

According to an embodiment of the first aspect, the method, if it is detected that the failure has occurred, initiates an MCG failure informing procedure of sending a message that indicates information related to the failure during the MCG failure informing procedure.

According to an embodiment of the first aspect, the the MCG failure processing operation includes at least one of the following: suspending all signaling radio bearer (SRB) transmissions via the MCG; suspending all data radio bearer (DRB) transmissions via the MCG; suspending all SRB transmissions via the MCG except for SRB0; suspending split SRB transmissions via the MCG; suspending all MCG SRB transmissions via the MCG except for SRB0; and suspending all MCG Data Radio Bearer (DRB) transmissions via the MCG.

According to an embodiment of the first aspect, if it is detected that the failure has occurred or when a message is sent to a base station that indicates information related to the failure, the method further includes: starting a timer; during the running of the timer, if it is detected that a failure has occurred in the SCG, triggering a radio resource control (RRC) connection re-establishment procedure; during the running of the timer, if an RRC reconfiguration message is received, stopping the timer; and when the timer expires, triggering the RRC connection re-establishment procedure.

According to an embodiment of the first aspect, the failure that has occurred in the MCG transmission includes at least one of the following conditions: an MCG wireless connection failure; an MCG lower layer indicating integrity protection check failure; RLC instructions of the MCG reach a maximum allowable number of transmission times or a maximum allowable number of re-transmission times; and an MCG MAC layer reporting a random access problem; and the failure that occurred in SCG includes at least one of the following conditions: an SCG wireless connection failure; an SCG lowest layer indicating integrity protection check failure; RLC instructions of the SCG reach a maximum allowable number of transmission times or a maximum allowable number of re-transmission times; and an SCG MAC indicating a random access problem.

According to an embodiment of the first aspect, if it is detected that the failure has occurred, the method further includes: if the UE is configured with a resume timer or a time period of the resume timer, executing the MCG failure processing operation, sending a message to a base station that indicates information related to the failure, and starting the resume timer; and if the UE is not configured with a resume timer or a time period for the resume timer, triggering the RRC connection re-establishment procedure.

According to an embodiment of the first aspect, the method further includes: sending a message to a base station, the message indicating information related to the failure; and receiving a radio resource control (RRC) reconfiguration message, where: if the MCG transmission is suspended, resuming SRB transmission, resuming DRB transmission and resuming split SRB transmission to corresponding suspended SRB on the MCG transmission, suspended DRB on the MCG transmission and suspended split SRB on the MCG transmission; and if the MCG transmission is not suspended, performing corresponding configurations based on information in the RRC reconfiguration message.

According to an embodiment of the first aspect, the method further includes: sending a message to a base station, the message indicating information related to the failure; and receiving a radio resource control (RRC) reconfiguration message, where: if the RRC reconfiguration message is a first RRC reconfiguration message received after the message is sent, executing RRC reconfiguration operations for corresponding suspended SRB on the MCG transmission, suspended DRB on the MCG transmission and suspended split SRB on the MCG transmission; and if the RRC reconfiguration message is not the first RRC reconfiguration message after the message is sent, performing corresponding configurations based on information indicated in the RRC reconfiguration message.

According to an embodiment of the first aspect, after it is detected that failure has occurred and before a radio resource control (RRC) reconfiguration message is received, the method further includes: detecting that a failure has occurred in the SCG transmission; if the MCG transmission is suspended or a timer is running, initiating an RRC connection re-establishment procedure; and if the MCG transmission is not suspended or a timer is stopped or not running, triggering a procedure to send SCG failure information for reporting SCG failure.

According to a second aspect of the present disclosure, a user equipment is provided. The user equipment includes: a processor; and a memory storing instructions; where the instructions, when executed by the processor, cause the user equipment to carry out the above-described method.

According to a third aspect of the present disclosure, a method performed by a user equipment (UE) is provided. The method includes: detecting a failure in a master cell group (MCG) transmission; and after determining that the UE is configured with a resume timer: transmitting a message to a base station (BS), the message containing information related to the failure, starting the resume timer upon sending the message to the BS, and triggering a radio resource control (RRC) connection re-establishment procedure when the resume timer expires.

According to an embodiment of the third aspect of the present disclosure, the method further includes: after determining that the UE is not configured with the resume timer, triggering the RRC connection re-establishment procedure.

According to an embodiment of the third aspect of the present disclosure, the method further includes: after transmitting the message to the BS and while the resume timer is still running, receiving an RRC reconfiguration message from the BS; and when the MCG transmission is suspended, based on the received RRC reconfiguration message, resuming the MCG transmission on: a previously suspended signaling radio bearer (SRB) if the SRB was suspended, a previously suspended data radio bearer (DRB) if the DRB was suspended, and a previously suspended split SRB if the split SRB was suspended.

According to an embodiment of the third aspect of the present disclosure, transmitting the message to the BS and starting the resume timer are part of an MCG failure processing operation that is initiated upon detecting the failure.

According to an embodiment of the third aspect of the present disclosure, the MCG failure processing operation further comprises at least one of: suspending all MCG transmissions on a signaling radio bearer (SRB), suspending all MCG transmissions on a data radio bearer (DRB), suspending all MCG transmissions on a split SRB, suspending all MCG transmissions on the SRB except for MCG transmission on SRB0, suspending all MCG SRBs except for the SRB0, and suspending all MCG DRBs.

According to an embodiment of the third aspect of the present disclosure, the method further includes: detecting a failure in a secondary cell group (SCG) transmission; when the failure in the SSG transmission is detected while the MCG transmission is suspended and the resume timer is still running: triggering the RRC connection re-establishment procedure, and in response to determining that an RRC reconfiguration message is received before the resume timer expires, stopping the resume timer; and when the failure in the SSG transmission is detected while the MCG transmission is not suspended and the resume timer is stopped or not running, triggering a procedure to send information related to the failure in the SCG transmission in an SCG failure message.

According to an embodiment of the third aspect of the present disclosure, the failure in the SCG transmission is detected when at least one of the following criteria is met: an SCG wireless connection failure is detected, an SCG lower layer indicates an integrity protection check failure, an SCG radio link control (RLC) layer indicates that a maximum allowable number of transmissions or a maximum allowable number of re-transmissions has been reached, and an SCG medium access control (MAC) layer indicates a random access problem, and wherein the failure in the MCG transmission is detected when at least one of the following criteria is met: an MCG wireless connection failure is detected, an MCG lower layer indicates an integrity protection check failure, an MCG RLC layer indicates that a maximum allowable number of transmissions a maximum allowable number of re-transmissions has been reached, and an MCG MAC layer indicates a random access problem.

According to an embodiment of the third aspect of the present disclosure, the method further includes: in response to sending the message to the base station: receiving, while the resume timer is still running, an RRC reconfiguration message; when the RRC reconfiguration message is a first RRC reconfiguration message after the message is sent, based on the received RRC reconfiguration message, performing RRC reconfiguration operations for resuming a corresponding: suspended MCG transmission on a signaling radio bearer (SRB), suspended MCG transmission on a data radio bearer (DRB), and suspended MCG transmission on a split SRB, and when the RRC reconfiguration message is not the first RRC reconfiguration message after the message is sent, performing corresponding configuration operations based on information indicated in the received RRC reconfiguration message.

According to a fourth aspect of the present disclosure, a user equipment (UE) is provided. The UE includes at least one processor, and at least one memory coupled to the at least one processor and storing one or more instructions. When the one or more instructions are executed by the at least one processor, the one or more instructions cause the UE to perform the method, as described above with reference to the third aspect of the present disclosure.

According to a fifth aspect of the present disclosure, a method performed by a base station (BS) is provided. The method includes: configuring, via radio resource control (RRC) signaling, a user equipment (UE) with a resume timer, the resume timer associated with a master cell group (MCG) transmission; and receiving a message from the UE when the UE detects a failure in the MCG transmission, the message containing information related to the failure, wherein the UE: starts the resume timer upon sending the message to the BS, and triggers an RRC connection re-establishment procedure when the resume timer expires.

According to an embodiment of the fifth aspect of the present disclosure, the UE transmitting the message to the BS and starting the resume timer are part of an MCG failure processing operation that the UE initiates upon detecting the failure.

According to an embodiment of the fifth aspect of the present disclosure, the method further includes, after the UE detects a failure in a secondary cell group (SCG) transmission: when the failure in the SSG transmission is detected while the MCG transmission is suspended and the resume timer is still running, the UE: triggers the RRC connection re-establishment procedure, and in response to determining that an RRC reconfiguration message is received before the resume timer expires, stops the resume timer; and when the failure in the SSG transmission is detected while the MCG transmission is not suspended and the resume timer is stopped or not running, the UE: triggers a procedure to send information related to the failure in the SCG transmission in an SCG failure message.

According to an embodiment of the fifth aspect of the present disclosure, the method further includes, in response to receiving the message from the UE: transmitting, to the UE, while the resume timer is still running, an RRC reconfiguration message, wherein: when the RRC reconfiguration message is a first RRC reconfiguration message after the message is received, based on the transmitted RRC reconfiguration message, the UE performs RRC reconfiguration operations for resuming a corresponding: suspended MCG transmission on a signaling radio bearer (SRB), suspended MCG transmission on a data radio bearer (DRB), and suspended MCG transmission on a split SRB, and when the RRC reconfiguration message is not the first RRC reconfiguration message after the message is received, the UE performs corresponding configuration operations based on information indicated in the transmitted RRC reconfiguration message.

DESCRIPTION

The following contains detailed disclosure of exemplary implementations of the present disclosure. It should be appreciated that the present disclosure is not limited to the disclosed implementations. Additionally, for the ease of understanding, the disclosure does not include detailed disclosure of general knowledge not directly related to the present disclosure in order to avoid confusion of the present disclosure.

Prior to detailed disclosure of the implementations, the following paragraphs define some of the terms used in the present disclosure. Unless otherwise specified, the terms in the present disclosure have the following meanings.

Figure 1:
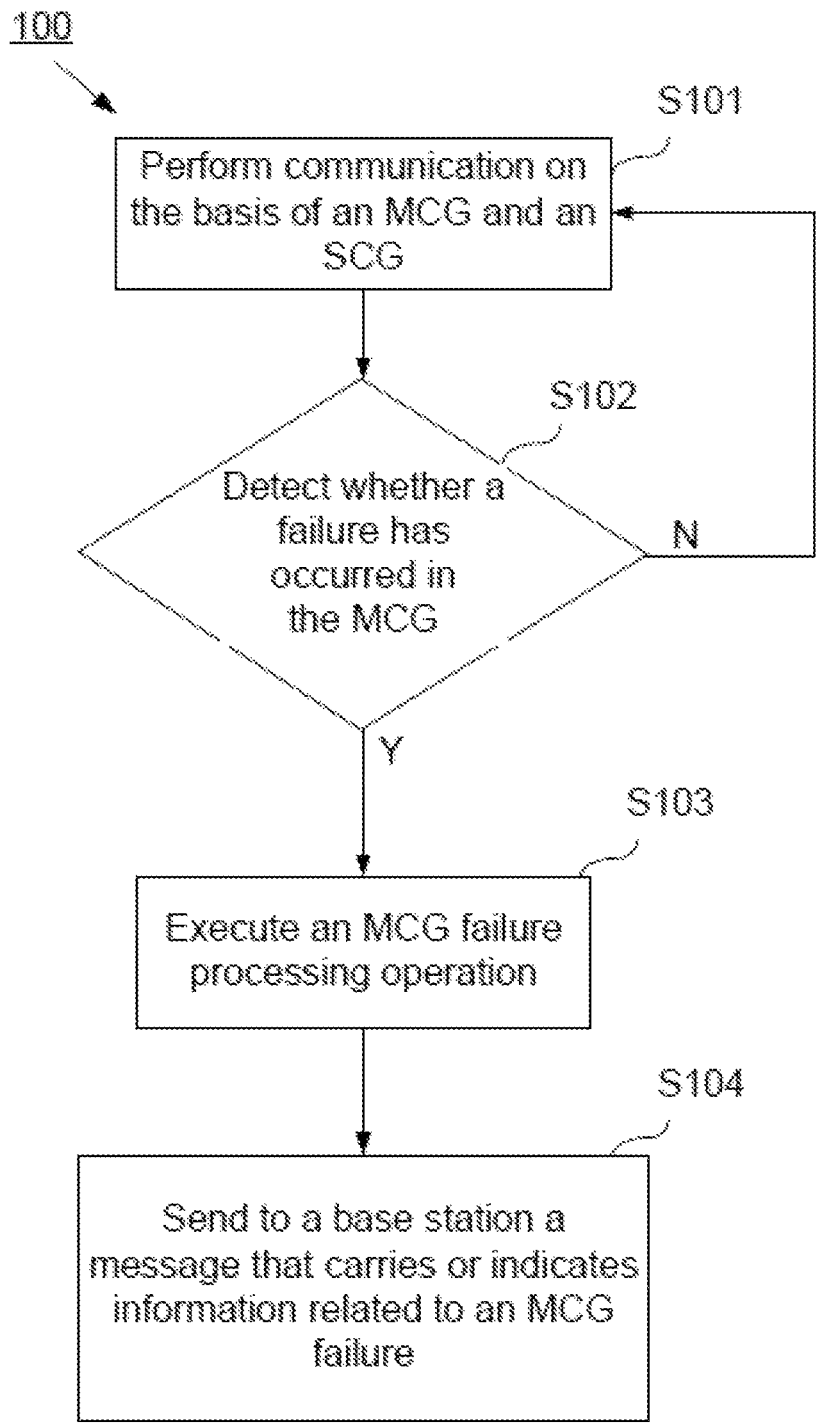
FIG. 1 is a flow chart illustrating a control method performed by a UE, according to an example implementation of the present disclosure.

UE User Equipment
NR New Radio
eLTE Enhanced Long Term Evolution
E-UTRA Evolved Universal Terrestrial Radio Access
DC Dual Connectivity
MC Multi Connectivity
gNB next generation node B (e.g., a base station node that provides a UE with NR user plane and control plane protocol stack and connects to the 5G core network
eNB evolved node B (e.g., a base station node that provides a UE with E-UTRAN user plane and control plane protocol stack and connects to the EPC core network)
ng-eNB next generation-evolved node B (e.g., a base station node that provides a UE with E-UTRAN user plane and control plane protocol stack and connects to the 5G core network)
SRB Signaling radio bearer
DRB Data radio b bearer
Split SRB Split signaling radio bearer
RLC Radio link control
PDCP Packet Data convergence Protocol
MAC Medium Access Control The following discloses a control method for a UE according to the present disclosure, and more specifically, an access control method for the UE. FIG. 1 is a flow chart illustrating a control method 100 for a UE, according to an example implementation of the present disclosure.

At step S101, the UE performs communications with base stations of a master cell group (MCG) and a secondary cell group (SCG).

At step S102, the UE detects whether a failure has occurred in the MCG transmission. The failure in the MCG transmission includes at least one of the following conditions: an MCG wireless connection failure; an MCG lower layer indicating integrity protection check failure; RLC instructions of the MCG reach a maximum allowable number of transmission times or a maximum allowable number of re-transmission times; and the MCG MAC reporting a random access problem.

At step S102, if it is detected that a failure has occurred in the MCG transmission, the method proceeds to step S103. At step 103, the UE executes a processing operation when a failure has occurred in the MCG, and the processing operation is called an "MCG failure processing operation."

The "MCG failure processing operation" includes at least one of the following: suspending all SRB transmissions via the MCG (or suspending all MCG transmissions on the SRB); suspending all DRB transmissions on the MCG (or suspending all MCG transmissions on the DRB); suspending all SRB transmissions via the MCG except for SRB0 (or suspending all MCG transmissions on the SRB except for SRB0); suspending split SRB transmissions via the MCG (or suspending all MCG transmissions on the split SRB); suspending all MCG SRBs except for SRB0; and suspending all MCG DRBs.

Subsequently, at step S104, the UE sends to the base station a message that carries or indicates information related to the MCG failure. More specifically, the message is transmitted via a split SRB. For example, an SRB1 is configured as the split SRB, and the message is sent via the SRB1.

Additionally, at step S102, when the UE does not detect that a failure has occurred in the MCG transmission, which is also when the MCG transmission has not failed, the method returns to step S101 and the UE continues to perform communication with the MCG and the SCG.

Figure 2:
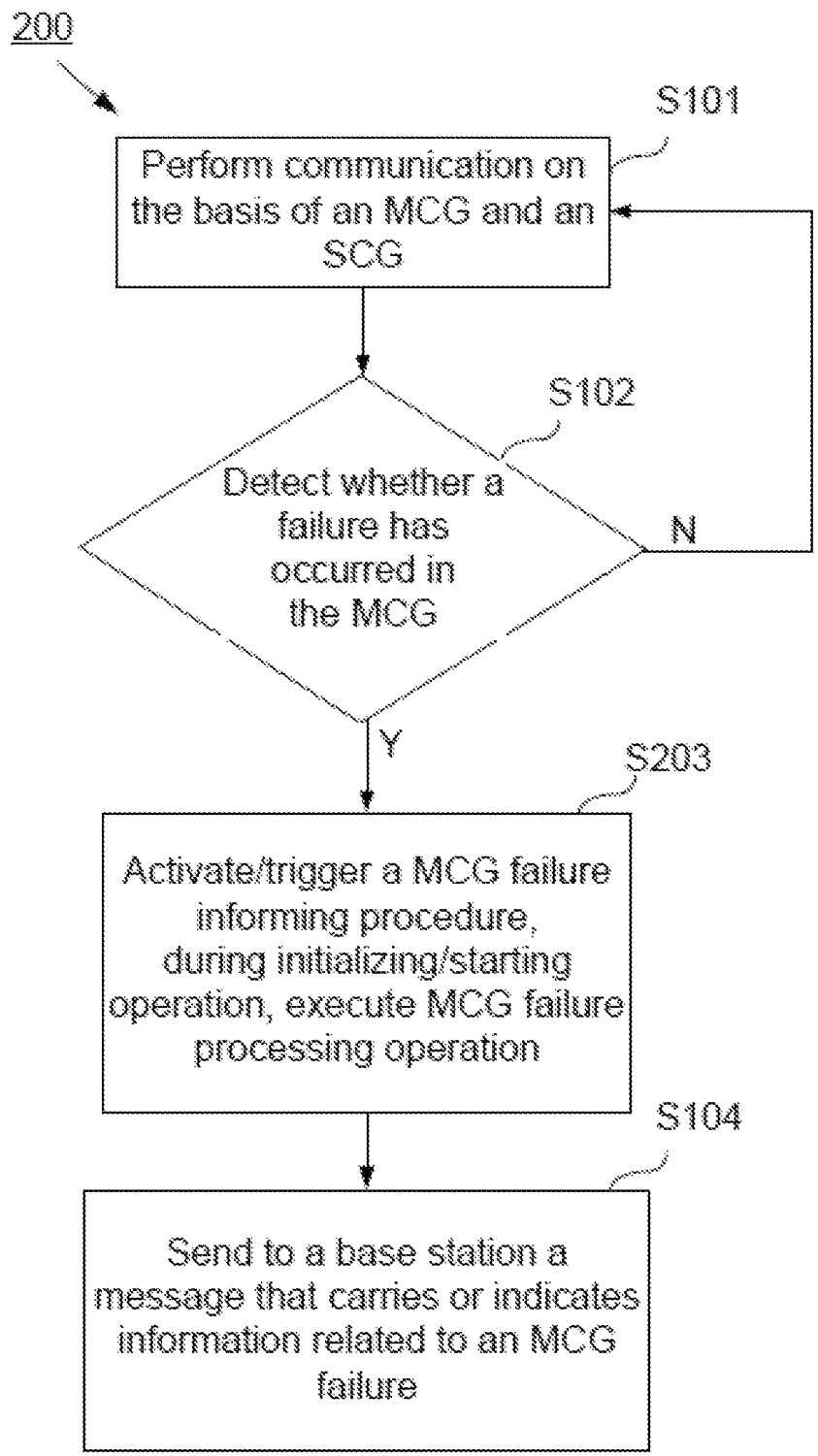
FIG. 2 is a flow chart illustrating a control method performed by a UE, according to an example implementation of the present disclosure.

FIG. 2 is a flow chart illustrating a control method 200 for a UE, according to an example implementation of the present disclosure. The control method 200 for the UE is different from the control method 100 for the UE in that step S203 replaces step S103, and the other steps are the same as the disclosed control method 100. The following disclosure explains the differences in detail, and the explanations of the same steps are omitted.

At step S102, the UE detects that a failure has occurred in the MCG transmission and proceeds to step S203. At step S203, the UE activates or triggers an MCG failure informing procedure, and during/upon an initializing or starting operation of the MCG failure informing procedure, executes the MCG failure processing operation as disclosed.

The present disclosure further is a control method for UE when the UE detects a failure has occurred in the MCG transmission and a failure has also occurred in the SCG transmission.

When the UE detects that a failure has occurred in the MCG transmission, the UE starts a resume timer. With respect to the resume timer, it may be started when the UE detects any disclosed failure in the MCG. The resume timer may also be started when the UE sends to a base station a message that carries or indicates information related to the MCG failure.

During the running of the resume timer, if the UE detects that a failure has occurred in the SCG (or in the SCG transmission), the UE triggers an RRC connection re-establishment procedure; and, if the UE receives an RRC reconfiguration message, the UE stops the timer.

When the resume timer expires, the UE triggers an RRC connection re-establishment procedure.

The failure in SCG includes at least one of the following: an SCG wireless connection failure; an SCG lowest layer indicating integrity protection check failure; RLC instructions of the SCG reach a maximum allowable number of transmission times or a maximum allowable number of re-transmission times; and an SCG MAC indicating a random access problem.

As stated previously, the implementations of the present disclosure are provided as exemplary implementations for the ease of understanding. The present disclosure is not limited to the disclosed implementations.

Implementation 1

Step 1: the UE detects at least one of the following failure conditions in the MCG:
an MCG wireless connection failure;
an MCG lower layer (e.g. PDCP layer) instruction indicating an integrity protection check failure;
RLC instructions of the MCG reach a maximum allowable number of transmission times or a maximum allowable number of re-transmission times;
an MCG MAC reporting a random access problem.

Step 2: the UE executes at least one of the following operations:
suspend all SRB transmissions via the MCG;
suspend all DRB transmissions via the MCG;
suspend all SRB transmissions via the MCG except for SRB0;
suspend split SRB transmissions via the MCG;
suspend all MCG SRBs except for SRB0; and
suspend all MCG DRBs.

The MCG SRB refers to the signaling bearer under dual connectivity or multi connectivity. The RLC and MAC logical channel configurations of the signaling bearer only configure/operate in the MCG.

The MCG DRB refers to the data bearer under dual connectivity or multi connectivity. The RLC and MAC logical channel configurations of the data bearer only configure/operate for the MCG.

The split SRB refers to the signaling bearer between the MN and the UE. The RLC and MAC logical channel configurations of the bearer are configured/operated for the MCG and SCG.

Figure 3:
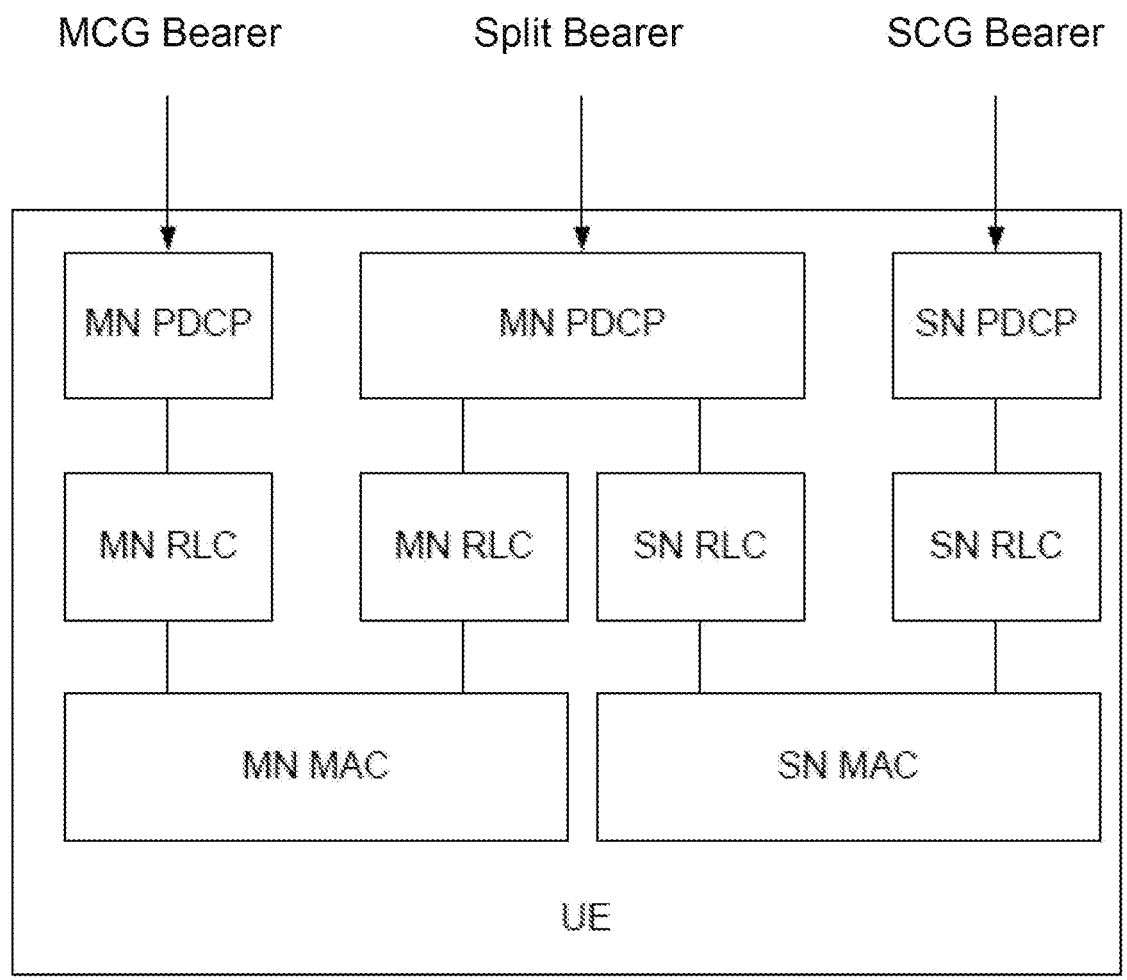
FIG. 3 is a diagram illustrating a UE communicating with MCG and SCG bearers, according to an example implementation of the present disclosure.

The MCG SRB, MCG DRB, and split SRB are illustrated in FIG. 3. FIG. 3 is a diagram illustrating a UE communicating with MCG and SCG bearers, according to an example implementation of the present disclosure. The bearer in FIG. 3 may be an SRB or a DRB.

Suspending SRB/DRB transmissions via the MCG refers to pausing/stopping SRB/DRB data receiving and sending via an MCG. If the RLC and MAC logical channel configurations for those SRBs/DRBs are configured for the MCG and SCG, this type of SRB/DRB data may still be received and sent via an SCG.

Suspending a split SRB transmission on the MCG refers to pausing/stopping the split SRB data receiving and sending via an MCG. Since the RLC and MAC logical channel configuration for the split SRB is configured in the MCG and SCG, the data may still be received and sent via an SCG despite the transmission of such being paused/stopped for the MCG.

Suspending SRB/DRB is different from suspending SRB/DRB transmission via the MCG. Suspending SRB/DRB refers to pausing/stopping an SRB/DRB operation. The PDCP entity of the suspended SRB/DRB and the RLC entity of the suspended SRB/DRB stop generating or processing data packets and the corresponding timers are also stopped. The suspended SRB/DRB information is saved in the UE context for resuming the SRB/DRB later.

Step 3: the UE sends to a base station a message that carries or indicates information related to an MCG failure. In the message, optionally, the UE may report that at least one of the disclosed failure conditions has occurred on the MCG. The message is transmitted via the split SRB in Step 2. For example, an SRB1 is configured as split SRB, and the message is sent via the SRB1.

Implementation 2

Implementation 2 is yet another implementation of Implementation 1. The following is detailed disclosure of this implementation.

Step 1: the UE detects at least one of the following failure conditions in the MCG:
- an MCG wireless connection failure;
- an MCG lower layer indicating integrity protection check failure;
- RLC instructions of the MCG reach a maximum allowable number of transmission times or a maximum allowable number of re-transmission times; and
- an MCG MAC reporting a random access problem.

Step 2: the UE activates/triggers a procedure of sending, to a base station, a message that carries or indicates information related to the MCG failure.

During/Upon an initializing or starting operation of the procedure, the UE executes at least one of the following:
- suspending all SRB transmissions via the MCG;
- suspending all DRB transmissions via the MCG;
- suspending all SRB transmissions via the MCG except for SRB0;
- suspending split SRB transmissions via the MCG;
- suspend all MCG SRBs except for SRB0; and
- suspending all MCG DRBs.

Step 3: the UE sends to a base station a message that carries or indicates information related to the MCG failure. In the message, optionally, the UE may report that at least one of the disclosed failure conditions has occurred on the MCG. The message is transmitted via the split SRB in Step 2. For example, an SRB1 is configured as a split SRB, and the message is sent via the SRB1.

Implementation 3

The difference between Implementation 3 and Implementation 1 is that a timer is started, which is called a resume timer in this example, when the UE detects at least one of the following failure conditions in the MCG:
- an MCG wireless connection failure;
- an MCG lower layer (e.g. PDCP layer) instruction indicating an integrity protection check failure;
- RLC instructions of the MCG reach a maximum allowable number of transmission times or a maximum allowable number of re-transmission times; and
- an MCG MAC reporting a random access problem.

During the running of the resume timer, the UE triggers an RRC connection re-establishment procedure, when the UE detects at least one of the following failure conditions has occurred in the SCG:
- an SCG wireless connection failure;
- an SCG lowest layer indicating integrity protection check failure;
- RLC instructions of the SCG reach a maximum allowable number of transmission times or a maximum allowable number of re-transmission times; and
- an SCG MAC indicating a random access problem.

When the resume timer expires, the UE triggers an RRC connection re-establishment procedure.

During the running of the resume timer, if the UE receives an RRC reconfiguration message, the UE stops the timer.

Implementation 4

The difference between Implementation 4 and Implementation 3 is that the resume timer is started when the UE sends to a base station a message that carries or indicates information related to the MCG failure.

The resume timer may be started when the UE initiates sending to the base station the message that carries or indicates information related to the MCG failure. Additionally, the resume timer may be started when the UE delivers to a lower layer the message that carries or indicates information related to the MCG failure. The resume timer may further be started after the UE triggers sending to the base station the message that carries or indicates information related to the MCG failure.

During the running of the resume timer, the UE triggers an RRC connection re-establishment procedure, when the UE detects at least one of the following failure conditions has occurred in the SCG:
- an SCG wireless connection failure;
- an SCG lowest layer indicating integrity protection check failure;
- RLC instructions of the SCG reach a maximum allowable number of transmission times or a maximum allowable number of re-transmission times; and
- an SCG MAC indicating a random access problem.

When the resume timer expires, the UE triggers an RRC connection re-establishment procedure.

During the running of the resume timer, if the UE receives an RRC reconfiguration message, the UE stops the timer.

Implementation 5

Implementation 5 is a combination of Implementations 1 and 3, or a combination of Implementations 1 and 4. After Step 1 of Implementation 1, the UE does not always proceed to Step 2 and/or Step 3, but may proceed with the following steps.

Step 1: the UE detects at least one of the following failure conditions in the MCG:
- an MCG wireless connection failure;
- an MCG lower layer indicating integrity protection check failure;
- RLC instructions of the MCG reach a maximum allowable number of transmission times or a maximum allowable number of re-transmission times; and
- an MCG MAC reporting a random access problem.

If the UE is configured with a resume timer or a time period of a resume timer, the UE continues executing Step 2 and Step 3 as disclosed in Implementation 1, and starts the resume timer and performs subsequent operations as disclosed in Implementation 3 or 4.

If the UE is not configured with a resume timer or a time period of a resume timer, the UE triggers an RRC connection re-establishment procedure.

Implementation 6

Implementation 6 is a combination of Implementations 2 and 3, or a combination of Implementations 2 and 4. After Step 1 of Implementation 2, the UE does not always proceed to Step 2 and Step 3, but may proceed with the following steps.

Step 1: the UE detects at least one of the following failure conditions in the MCG:
- an MCG wireless connection failure;
- an MCG lower layer indicating integrity protection check failure;
- RLC instructions of the MCG reach a maximum allowable number of transmission times or a maximum allowable number of re-transmission times; and
- an MCG MAC reporting a random access problem.

If the UE is configured with a resume timer or a time period of a resume timer, the UE continues executing Step 2 as disclosed in Implementation 2, which is activating/triggering a procedure of sending, to a base station, a message that carries or indicates information related to the MCG failure, and starts the resume timer and performs subsequent operations as disclosed in Implementation 3 or 4.

If the UE is not configured with a resume timer or a time period of a resume timer, the UE triggers an RRC connection re-establishment procedure.

Implementation 7

After the UE sends to a base station a message that carries or indicates information related to an MCG failure, the UE may receive an RRC reconfiguration message. When the UE receives the RRC reconfiguration message, if the UE MCG transmission is suspended, the UE executes at least one of the following operations:

For the suspended SRB transmission on the MCG, the UE executes one or more of the following operations:
   executing a PDCP data recovery of the SRB;
   re-establishing the PDCP entity of the SRB;
   re-establishing the RLC entity of the SRB; and
   resuming the suspended SRB transmission on the MCG.

For the suspended DRB transmission on the MCG, the UE executes one or more of the following operations:
   executing a PDCP data recovery of the DRB;
   re-establishing the PDCP entity of the DRB;
   re-establishing the RLC entity of the DRB; and
   resuming the suspended DRB transmission on the MCG.

For the suspended split SRB transmission on the MCG, the UE executes one or more of the following operations:
   executing a PDCP data recovery;
   re-establishing the PDCP entity of the split SRB;
   re-establishing the RLC entity of the split SRB; and
   resuming the suspended split SRB transmission on the MCG.

Preferably, if the split SRB is SRB1, then for the suspended SRB1 transmission on the MCG, the UE executes one or more of the following operations:
   executing a PDCP data recovery of the SRB1;
   re-establishing the PDCP entity of the SRB1;
   re-establishing the RLC entity of the SRB1; and
   resuming the suspended SRB1 transmission on the MCG.

For the suspended DRB, the UE restores its PDCP status, re-establishes PDCP entity, and resumes the suspended DRB. For the suspended SRB, the UE restores its PDCP status and re-establishes PDCP entity, and resume the suspended SRB.

If the MCG transmission is suspended, the suspending procedure is as disclosed in Implementation 1. Specifically, the UE suspends the MCG transmission before receiving the RRC reconfiguration message as disclosed in Implementation 1. If the UE MCG transmission is not suspended, the UE performs corresponding configurations based on information in the RRC reconfiguration message.

Variation of Implementation 7

In a variation of Implementation 7, the UE receives an RRC reconfiguration message. If the RRC reconfiguration message is the first RRC reconfiguration message received after the UE sends to a base station a message that carries or indicates information related to the MCG failure as in Implementation 1, the UE, upon receiving the RRC reconfiguration message, executes at least one of the following operations:

For the suspended SRB transmission on the MCG, the UE executes one or more of the following operations:
   executing a PDCP data recovery of the SRB;
   re-establishing the PDCP entity of the SRB;
   re-establishing the RLC entity of the SRB; and
   resuming the suspended SRB transmission on the MCG.

For the suspended DRB transmission on the MCG, the UE executes one or more of the following operations:
   executing a PDCP data recovery of the DRB;
   re-establishing the PDCP entity of the DRB;
   re-establishing the RLC entity of the DRB; and
   resuming the suspended DRB transmission on the MCG.

For the suspended split SRB transmission on the MCG, the UE executes one or more of the following operations:
   executing a PDCP data recovery;
   re-establishing the PDCP entity of the split SRB;
   re-establishing the RLC entity of the split SRB; and
   resuming the suspended split SRB transmission on the MCG.

Preferably, if the split SRB is SRB1, then for the suspended SRB1 transmission on the MCG, the UE executes one or more of the following operations:
   executing a PDCP data recovery of the SRB1;
   re-establishing the PDCP entity of the SRB1;
   re-establishing the RLC entity of the SRB1; and
   resuming the suspended SRB1 transmission on the MCG.

For the suspended DRB, the UE restores its PDCP status and re-establishes PDCP entity, and resumes the suspended DRB.

For the suspended SRB, the UE restores its PDCP status, re-establishes the PDCP entity and resumes the suspended SRB.

If the RRC reconfiguration message is not the first RRC reconfiguration message received after the UE sends a message that carries or indicates information related to the MCG failure as in Implementation 1, the UE performs corresponding configurations based on information indicated in the RRC reconfiguration message.

The UE performs corresponding suspension operations concurrently or before the UE sends a message that carries or indicates information related to the MCG failure, and, as indicated in Implementations 1 and 2, the decision condition "whether the UE receives an RRC reconfiguration message after the UE sends a message that carries or indicates information related to the MCG failure" is deemed to be equivalent to the decision condition "whether the UE MCG transmission is suspended."

The disclosed PDCP data recovery procedure may refer to the disclosure in 3GPP Technical Specification 38.323 Section 5.5.

Implementation 8

After the UE detects that a failure has occurred in the MCG and before the UE receives an RRC reconfiguration message, the UE may detect that a failure has occurred in the SCG. When the UE detects a failure has occurred in the SCG, the UE determines whether to perform an RRC connection re-establishment procedure or trigger an SCG failure information transmission procedure according to the MCG transmission.

The UE detects that at least one of the following failure conditions has occurred in the SCG:
   an SCG wireless connection failure;
   an SCG lowest layer indicating integrity protection check failure;
   RLC instructions of the SCG reach a maximum allowable number of transmission times or a maximum allowable number of re-transmission times; and
   an SCG MAC indicating a random access problem.

If the MCG transmission is suspended, the UE triggers/activates an RRC connection re-establishment procedure. If the MCG transmission is not suspended, the UE triggers/activates a procedure to send SCG failure information for reporting SCG failure.

The following MCG transmission operation is also disclosed in Implementation 1.

Variation of Implementation 8

In a variation of Implementation 7, when the UE detects a failure has occurred in the SCG, the UE determines whether to perform an RRC connection re-establishment procedure or trigger an SCG failure information transmission procedure according to a resume timer.

The UE detects at least one of the following failure conditions has occurred in the SCG:
- an SCG wireless connection failure;
- an SCG lowest layer indicating integrity protection check failure;
- RLC instructions of the SCG reach a maximum allowable number of transmission times or a maximum allowable number of re-transmission times; and
- an SCG MAC indicating a random access problem.

If the resume timer is running, the UE triggers/activates an RRC connection re-establishment procedure. If the resume timer is not running, the UE triggers/activates a procedure to send SCG failure information for reporting SCG failure.

The following MCG transmission operation is also disclosed in Implementation 1.

The UE performs corresponding suspension operations and starts the resume timer concurrently or before the UE sends a message that carries or indicates information related to the MCG failure, and as indicated in Implementations 3 and 4, the decision condition "whether the UE MCG transmission is suspended" is deemed to be equivalent to the decision condition "whether the resume timer is running."

Figure 4:
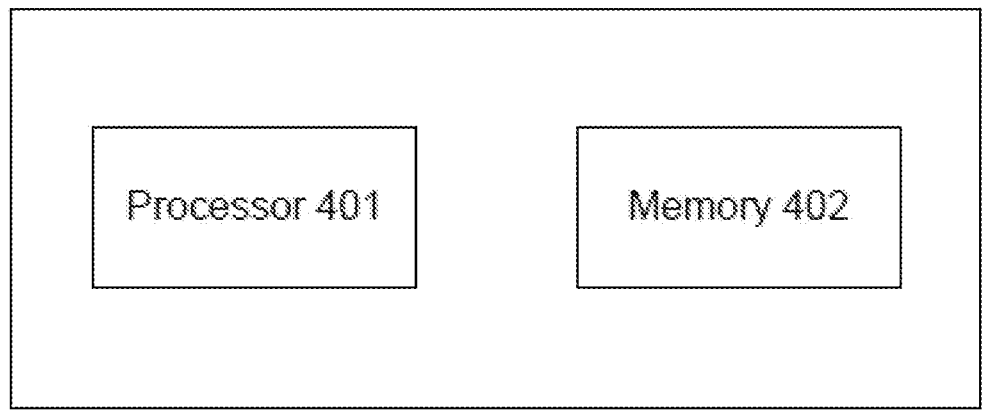
FIG. 4 is a block diagram illustrating a user equipment, according to an example implementation of the present disclosure.

FIG. 4 is a block diagram illustrating a user equipment 40, according to an example implementation of the present disclosure. As illustrated in FIG. 4, the user equipment 40 includes a processor 401 and a memory 402. The processor 401 may include a microprocessor, a microcontroller, an embedded processor, etc.

The memory 402 may include a volatile memory (e.g., random access memory RAM), a hard disk drive (HDD), a non-volatile memory (e.g., flash memory), or any other types of memories. The memory 402 stores program instructions. The program instructions, when executed by the processor 401, cause the user equipment to carry out the communication control disclosed methods.

According to the present disclosure, executing the programs stored on the user equipment may be implemented by controlling a Central Processor Unit (CPU) and causing a computer to perform the functions of the present disclosure. The program or the information being processed by the program may be stored in a volatile memory (e.g., random access memory (RAM)), a hard disk drive (HDD), a non-volatile memory (e.g., flash memory), or any other suitable memory system.

The program that performs the disclosed functions may be stored on a computer-readable medium. Computer systems, by accessing the programs stored in the storage medium execute the programs to perform the corresponding functions. The disclosed "computer system" may be a computer system embedded in equipment, may include an operating system or hardware (e.g., peripheral equipment). A "computer-readable medium" may be a semiconductor storage medium, optical storage medium, a magnetic storage medium, a storage medium for short-term dynamic storing of programs, or any other storage medium readable by a computer.

Various characteristics or functions disclosed herein may be performed or implemented by electronics, such as a monolithic or multiple-chip integrated circuit. The electronics designed for implementing the disclosed functions may include general processors, a digital signal processor (DSP), Applications Specific Integrated Circuitry (ASIC), Field Programmable Gate Arrays (FPGAs) or any other programmable logic devices, discrete gate or transistor logic, discrete hardware assembly, or any combination of the disclosed devices.

A general processor may be a microprocessor, or any present processor, controller, microcontroller, or state machine. The disclosed electronics may be digital electronics or analog electronics. As semiconductor technology continues to improve, it is noted that there may be new integrated circuit technology replacing present integrated circuits, one or more implementations of the present disclosure may be implemented with the new integrated circuit technology.

The present disclosure is not limited to the disclosed implementations. Although various examples are disclosed, it should be noted that the present disclosure is not limited thereto. Fixed or non-mobile electronic equipment installed indoor or outdoor may be in a form of terminal equipment or communications equipment. For example, the electronic equipment may be Audio-Video equipment.

The implementations of the present disclosure are disclosed in detail with reference to the accompanying drawings. However, the implementations are not limited to the disclosed implementations. The present disclosure may also include design variations without departing from the scope or spirit of the disclosed concepts. Furthermore, the present disclosure also encompasses modifications within the scope of the claims, implementations suitably combining various disclosed implementations. Additionally, the disclosed implementations may have component substitutions that have similar effect.

What is claimed is:

1. A method performed by a user equipment (UE), the method comprising:
   detecting a failure in a master cell group (MCG) transmission; and
   after determining that the UE is configured with a resume timer:
   transmitting a message to a base station (BS), the message containing information related to the failure,
   starting the resume timer upon sending the message to the BS, and
   triggering a radio resource control (RRC) connection re-establishment procedure when the resume timer expires.

2. The method of claim 1, further comprising:
   after determining that the UE is not configured with the resume timer, triggering the RRC connection re-establishment procedure.

3. The method of claim 1, further comprising:
   after transmitting the message to the BS and while the resume timer is still running, receiving an RRC reconfiguration message from the BS; and
   when the MCG transmission is suspended, resuming, based on the received RRC configuration message, the MCG transmission on:
   a previously suspended signaling radio bearer (SRB) in response to determining that the SRB was suspended,
   a previously suspended data radio bearer (DRB) in response to determining that the DRB was suspended, and a previously suspended split SRB in response to determining that the split SRB was suspended.

4. The method of claim 1, wherein:
transmitting the message to the BS and starting the resume timer are part of an MCG failure processing operation that is initiated upon detecting the failure.

5. The method of claim 4, wherein the MCG failure processing operation further comprises at least one of:
suspending all MCG transmissions on a signaling radio bearer (SRB),
suspending all MCG transmissions on a data radio bearer (DRB),
suspending all MCG transmissions on a split SRB,
suspending all MCG transmissions on the SRB except for MCG transmissions on SRB0,
suspending all MCG SRBs except for the SRB0, and
suspending all MCG DRBs.

6. The method of claim 1, further comprising:
detecting a failure in a secondary cell group (SCG) transmission;
when the failure in the SCG transmission is detected while the MCG transmission is suspended and the resume timer is still running:
triggering the RRC connection re-establishment procedure, and
in response to determining that an RRC reconfiguration message is received before the resume timer expires, stopping the resume timer; and
when the failure in the SCG transmission is detected while the MCG transmission is not suspended and the resume timer is stopped or not running, triggering a procedure to send information related to the failure in the SCG transmission in an SCG failure message.

7. The method of claim 6, wherein:
the failure in the SCG transmission is detected when at least one of the following criteria is met:
an SCG wireless connection failure is detected,
an SCG lower layer indicates an integrity protection check failure,
an SCG radio link control (RLC) layer indicates that a maximum allowable number of transmissions or a maximum allowable number of re-transmissions has been reached, and
an SCG medium access control (MAC) layer indicates a random access problem, and
wherein the failure in the MCG transmission is detected when at least one of the following criteria is met:
an MCG wireless connection failure is detected,
an MCG lower layer indicates an integrity protection check failure,
an MCG RLC layer indicates that a maximum allowable number of transmissions or a maximum allowable number of re-transmissions has been reached, and
an MCG MAC layer indicates a random access problem.

8. The method of claim 1, further comprising, in response to sending the message to the base station:
receiving, while the resume timer is still running, an RRC reconfiguration message;
when the RRC reconfiguration message is a first RRC reconfiguration message after the message is sent, performing RRC reconfiguration operations for resuming a corresponding:
suspended MCG transmission on a signaling radio bearer (SRB),
suspended MCG transmission on a data radio bearer (DRB), or
suspended MCG transmission on a split SRB, and
when the RRC reconfiguration message is not the first RRC reconfiguration message after the message is sent, performing corresponding configuration operations based on information indicated in the received RRC reconfiguration message.

9. A user equipment (UE), comprising:
at least one processor; and
at least one non-transitory machine-readable medium coupled to the at least one processor and storing one or more instructions, that when executed by the at least one processor, cause the UE to:
detect a failure in a master cell group (MCG) transmission; and
after determining that the UE is configured with a resume timer:
transmit a message to a base station (BS), the message containing information related to the failure,
start the resume timer upon sending the message to the BS, and
trigger a radio resource control (RRC) connection re-establishment procedure when the resume timer expires.

10. The UE of claim 9, wherein the one or more instructions, when executed by the at least one processor, further cause the UE to:
after determining that the UE is not configured with the resume timer, trigger the RRC connection re-establishment procedure.

11. The UE of claim 9, wherein the one or more instructions, when executed by the at least one processor, further cause the UE to:
after transmitting the message to the BS and while the resume timer is still running, receive an RRC reconfiguration message from the BS; and
when the MCG transmission is suspended, resume, based on the received RRC configuration message, the MCG transmission on:
a previously suspended signaling radio bearer (SRB) in response to determining that the SRB was suspended,
a previously suspended data radio bearer (DRB) in response to determining that the DRB was suspended, and
a previously suspended split SRB in response to determining that the split SRB was suspended.

12. The UE of claim 9, wherein:
transmitting the message to the BS and starting the resume timer are part of an MCG failure processing operation that the UE initiates upon detecting the failure.

13. The UE of claim 12, wherein the MCG failure processing operation further comprises at least one of:
suspending all MCG transmissions on a signaling radio bearer (SRB),
suspending all MCG transmissions on a data radio bearer (DRB),
suspending all MCG transmissions on a split SRB,
suspending all MCG transmissions on the SRB except for MCG transmissions on SRB0,
suspending all MCG SRBs except for the SRB0, and
suspending all MCG DRBs.

14. The UE of claim 9, wherein the one or more instructions, when executed by the at least one processor, further cause the UE to:

detect a failure in a secondary cell group (SCG) transmission;
when the failure in the SCG transmission is detected while the MCG transmission is suspended and the resume timer is still running:
  trigger the RRC connection re-establishment procedure, and
  in response to determining that an RRC reconfiguration message is received before the resume timer expires, stop the resume timer; and
when the failure in the SCG transmission is detected while the MCG transmission is not suspended and the resume timer is stopped or not running, trigger a procedure to send information related to the failure in the SCG transmission in an SCG failure message.

15. The UE of claim 14, wherein:
the failure in the SCG transmission is detected when at least one of the following criteria is met:
  an SCG wireless connection failure is detected,
  an SCG lower layer indicates an integrity protection check failure,
  an SCG radio link control (RLC) layer indicates that a maximum allowable number of transmissions or a maximum allowable number of re-transmissions has been reached, and
  an SCG medium access control (MAC) layer indicates a random access problem, and
wherein the failure in the MCG transmission is detected when at least one of the following criteria is met:
  an MCG wireless connection failure is detected,
  an MCG lower layer indicates an integrity protection check failure,
  an MCG RLC layer indicates that a maximum allowable number of transmissions or a maximum allowable number of re-transmissions has been reached, and
  an MCG MAC layer indicates a random access problem.

16. The UE of claim 9, wherein the one or more instructions, when executed by the at least one processor, further cause the UE to, in response to sending the message to the base station:
receive, while the resume timer is still running, an RRC reconfiguration message;
when the RRC reconfiguration message is a first RRC reconfiguration message after the message is sent, perform RRC reconfiguration operations for resuming a corresponding:
  suspended MCG transmission on a signaling radio bearer (SRB),
  suspended MCG transmission on a data radio bearer (DRB), or
  suspended MCG transmission on a split SRB, and
when the RRC reconfiguration message is not the first RRC reconfiguration message after the message is sent, perform corresponding configuration operations based on information indicated in the received RRC reconfiguration message.

17. A method performed by a base station (BS), the method comprising:
configuring, via radio resource control (RRC) signaling, a user equipment (UE) with a resume timer, the resume timer associated with a master cell group (MCG) transmission; and
receiving a message from the UE when the UE detects a failure in the MCG transmission, the message containing information related to the failure, wherein the UE:
  starts the resume timer upon sending the message to the BS, and
  triggers an RRC connection re-establishment procedure when the resume timer expires.

18. The method of claim 17, wherein:
the UE transmitting the message to the BS and starting the resume timer are part of an MCG failure processing operation that the UE initiates upon detecting the failure.

19. The method of claim 17, further comprising, after the UE detects a failure in a secondary cell group (SCG) transmission:
when the failure in the SCG transmission is detected while the MCG transmission is suspended and the resume timer is still running, the UE:
  triggers the RRC connection re-establishment procedure, and
  in response to determining that an RRC reconfiguration message is received before the resume timer expires, stops the resume timer; and
when the failure in the SCG transmission is detected while the MCG transmission is not suspended and the resume timer is stopped or not running, the UE:
  triggers a procedure to send information related to the failure in the SCG transmission in an SCG failure message.

20. The method of claim 17, further comprising, in response to receiving the message from the UE:
transmitting, to the UE, while the resume timer is still running, an RRC reconfiguration message, wherein:
when the RRC reconfiguration message is a first RRC reconfiguration message after the message is received, the UE performs RRC reconfiguration operations for resuming a corresponding:
  suspended MCG transmission on a signaling radio bearer (SRB),
  suspended MCG transmission on a data radio bearer (DRB), or
  suspended MCG transmission on a split SRB, and
when the RRC reconfiguration message is not the first RRC reconfiguration message after the message is received, the UE performs corresponding configuration operations based on information indicated in the transmitted RRC reconfiguration message.

* * * * *